United States Patent [19]

Yamada

[11] Patent Number: 5,264,931
[45] Date of Patent: Nov. 23, 1993

[54] TELEVISION RECEIVER UTILIZING DIGITAL SIGNAL PROCESSORS ADAPTABLE TO VARIOUS TELEVISION STANDARDS

[75] Inventor: Masahiro Yamada, Kawasaki, Japan

[73] Assignee: Kabushiki Kaisha Toshiba, Kawasaki, Japan

[21] Appl. No.: 928,403

[22] Filed: Aug. 12, 1992

[30] Foreign Application Priority Data

Aug. 27, 1991 [JP] Japan .................. 3-215415

[51] Int. Cl.$^5$ .................. H04N 5/46; H04N 7/00
[52] U.S. Cl. .................. 358/160; 358/188
[58] Field of Search .................. 358/188, 160, 140

[56] References Cited

U.S. PATENT DOCUMENTS

| | | | |
|---|---|---|---|
| 4,396,938 | 8/1983 | Dischert | 358/160 X |
| 4,635,121 | 1/1987 | Hoffman et al. | 358/188 |
| 4,727,426 | 2/1988 | Itabashi et al. | 358/188 |
| 4,860,098 | 8/1989 | Murphy | 358/188 X |
| 4,991,019 | 2/1991 | Enami et al. | 358/160 |
| 5,157,495 | 10/1992 | Small | 358/140 X |

OTHER PUBLICATIONS

"A Proposed Universal Signal-Processing System", Murakami et al., SMPTE Journal, Jun. 1987, pp. 527-531.
"Data-Driver Processor For Video Signal Processing" Ulrich Schmide et al.; IEEE 1990 International Conference on Consumer Electronics.
U.S. Application Ser. No. 670,015, filed Mar. 13, 1991.

*Primary Examiner*—Mark R. Powell
*Attorney, Agent, or Firm*—Cushman, Darby & Cushman

[57] ABSTRACT

An analog image signal output from a selector is converted to a digital image signal by an A/D converter, and input to an image signal processing apparatus comprising a plurality of digital signal processors. The analog image signal is also input to a system discriminating circuit which discriminates the television system of the signal. An external program memory stores a plurality of external programs corresponding to television systems. An external program suitable for the image signal is selected from the external program memory, read out through a loader, and transmitted to an internal program memory incorporated in each of the digital signal processors of the image signal processing apparatus.

12 Claims, 14 Drawing Sheets

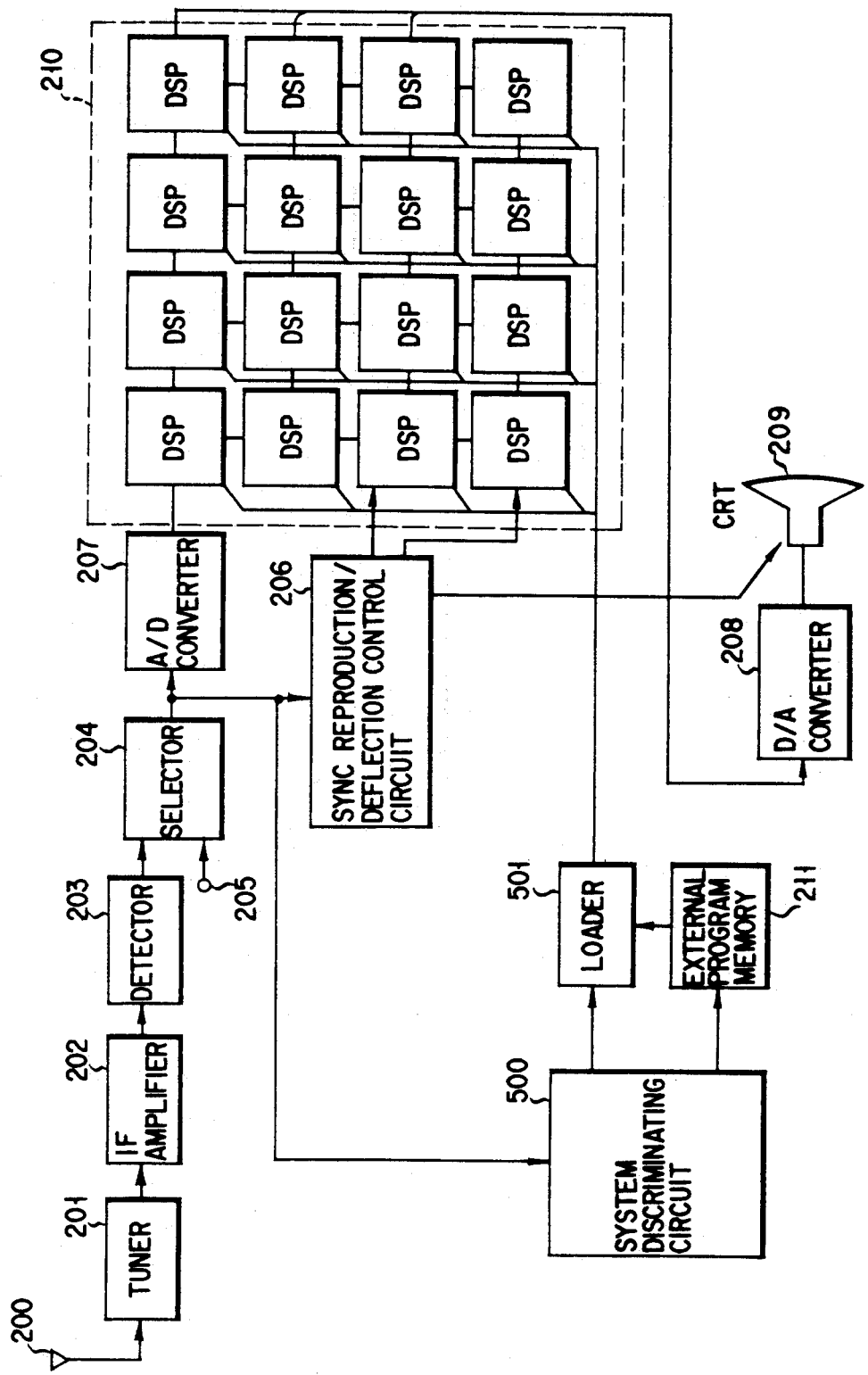
F I G. 1

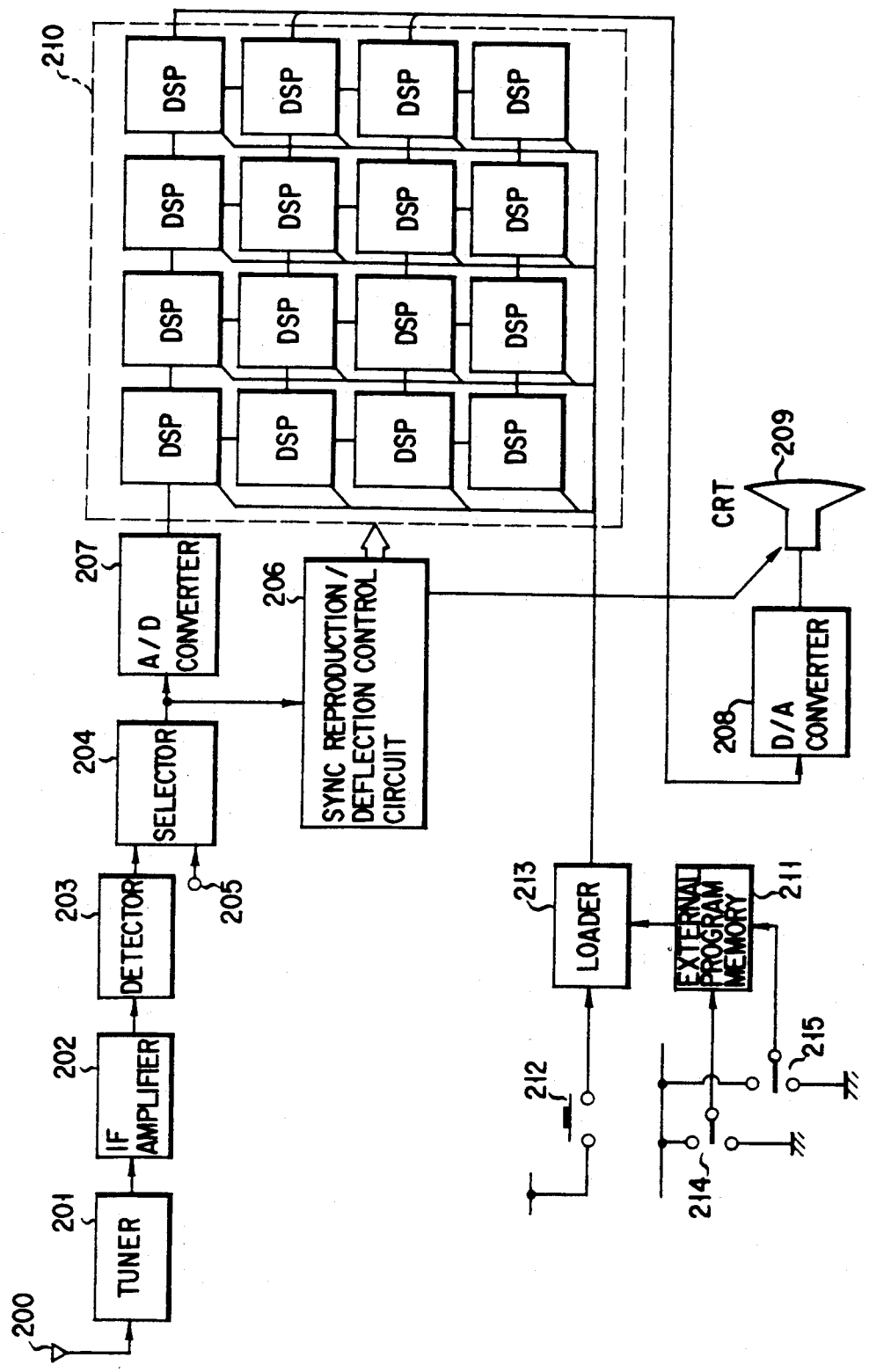
F I G. 2

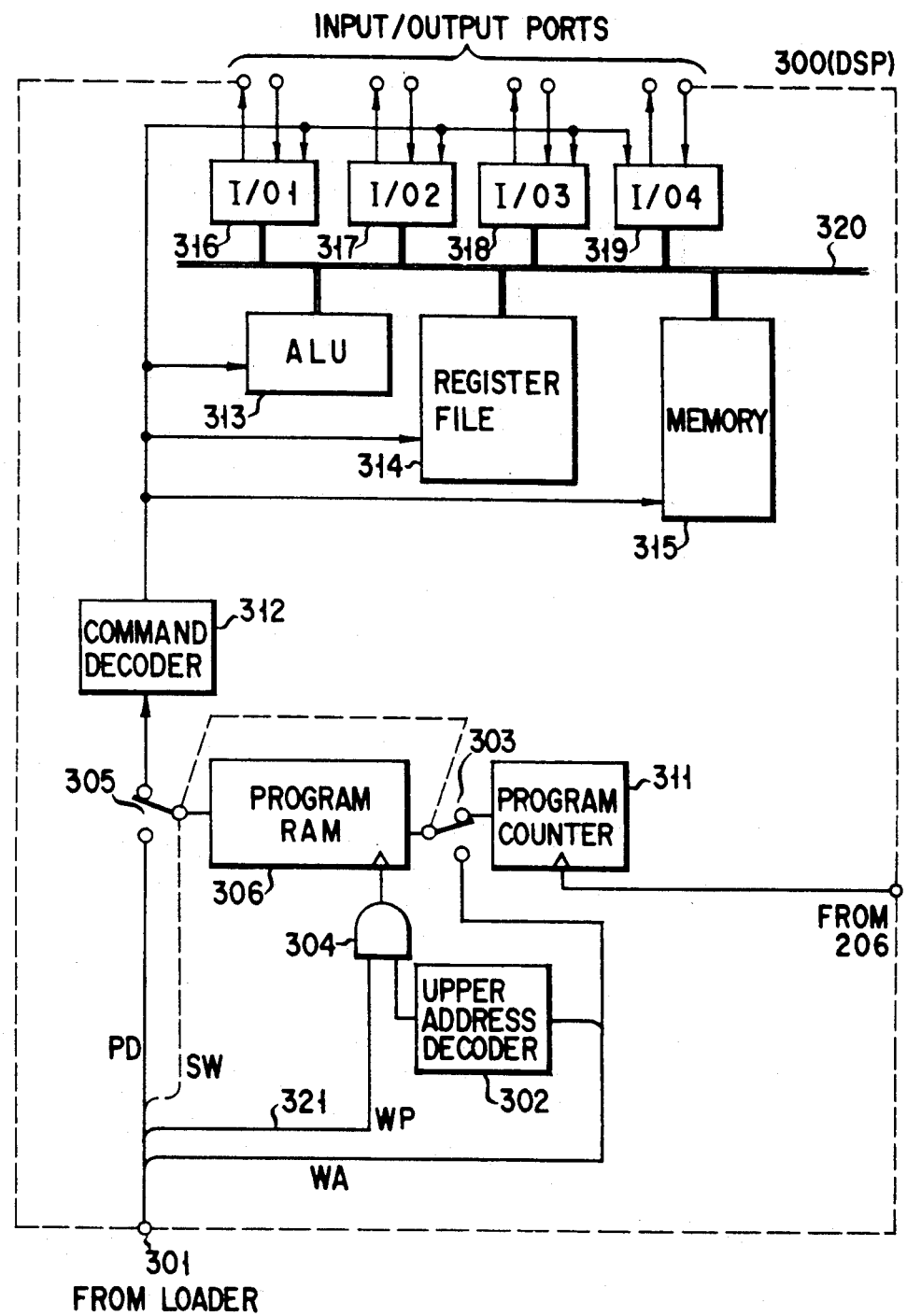
F I G. 4

SECAM SYSTEM SIGNAL PROCESSING FUNCTIONS

PAL SYSTEM SIGNAL PROCESSING FUNCTIONS

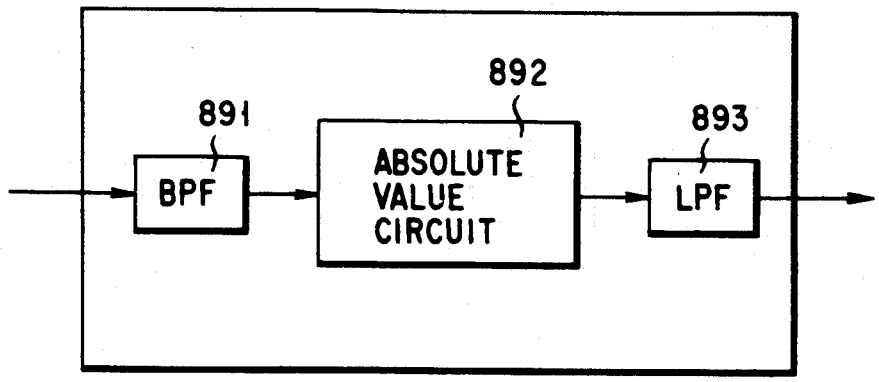
F I G. 13C
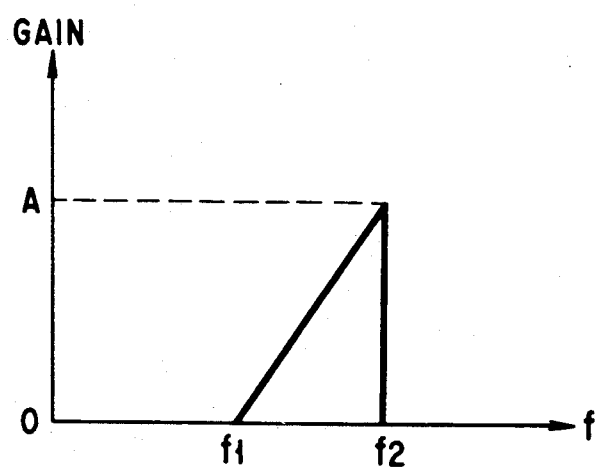
F I G. 13D

TELEVISION RECEIVER UTILIZING DIGITAL SIGNAL PROCESSORS ADAPTABLE TO VARIOUS TELEVISION STANDARDS

BACKGROUND OF THE INVENTION

1. Field of the Invention

The present invention relates to a television receiver utilizing digital signal processors (hereinafter referred to as DSPs).

2. Description of the Related Art

Recent years, a digital television receiver which performs signal processing by means of a plurality of DSPs has been developed. DSPs are used in an image signal processing section, i.e., in the stage subsequent to an analog-to-digital converter for converting a television signal to a digital signal. Each DSP has an internal program memory for performing a television signal processing function assigned thereto, for example, a luminance signal/chrominance signal (Y/C) separating function, a delay function, a chrominance signal detecting function, a filtering function or a matrix processing function.

Since there are various television systems, such as an NTSC system, a PAL system, a SECAM system, and the like, it is necessary to provide a television signal processing functions suitable for the television system. However, a program memory incorporated in one DSP has only a limited memory capacity, it cannot store programs corresponding to a plurality of television systems. To increase the capacity of the program memory incorporated in a DSP, a ready-made DSP cannot be used. If the design of the DSP is changed to increase the capacity of the program memory incorporated therein, a considerable cost will be required.

SUMMARY OF THE INVENTION

It is accordingly an object of the present invention to provide a television receiver utilizing DSPs, having an external program memory of a large capacity which stores signal processing programs corresponding to a plurality of television systems. A program suitable for the television system of an input image signal is read out from the external program memory and written into an internal program of the corresponding DSP, thereby obtaining a multifunctional image processing section including the DSPs.

Another object of the present invention is to provide an improved television receiver utilizing DSPs, which can automatically discriminate the television system of an input image signal and set the program suitable for the television system in the image signal processing section, even if the user does not discriminate the television system of the input image signal.

To achieve the above object, a television receiver using DSPs according to an aspect of the present invention comprises:

an external program memory for storing a plurality of external programs corresponding to television systems;

A/D converting means for A/D converting an input image signal and outputting a digital image signal;

an image signal processing section for processing the digital image signal, said section comprising a plurality of digital signal processors connected to one another, each having internal program memory, and one of the digital signal processors receiving the digital image signal; and transmission means for reading one of the external programs which corresponds to one of the television systems from said external program memory, and transmitting predetermined step data of the read program to internal program memories of said plurality of digital signal processors.

A television receiver using DSPs according to another aspect of the present invention comprises:

an external program memory for storing a plurality of external programs corresponding to television systems;

A/D converting means for A/D converting an input image signal and outputting a digital image signal;

an image signal processing section for processing the digital image signal, said section comprising a plurality of digital signal processors connected to one another, each having an internal program memory, and one of the digital signal processors receiving the digital image signal;

system discriminating circuit for discriminating the television system of the input image signal, and generating a timing signal representing a change of the television system and a discrimination signal representing the type of the television system; and transmission means for selecting an external program suitable for the television system of the input image signal in accordance with the discrimination signal output from said system discriminating circuit and transmitting predetermined step data of the selected external program to internal program memories of the plurality of digital signal processors in synchronism with the timing signal.

BRIEF DESCRIPTION OF THE DRAWINGS

FIG. 1 is a block diagram showing an embodiment of the present invention;

FIG. 2 is a block diagram showing another embodiment of the present invention;

FIG. 4 is a diagram showing an internal structure of a DSP;

FIG. 13C is a diagram showing a FM demodulating circuit set in a DSP; and

FIG. 13D shows a frequency characteristic of a BPF shown in FIG. 13C.

DETAILED DESCRIPTION OF THE PREFERRED EMBODIMENTS

Figure 3:
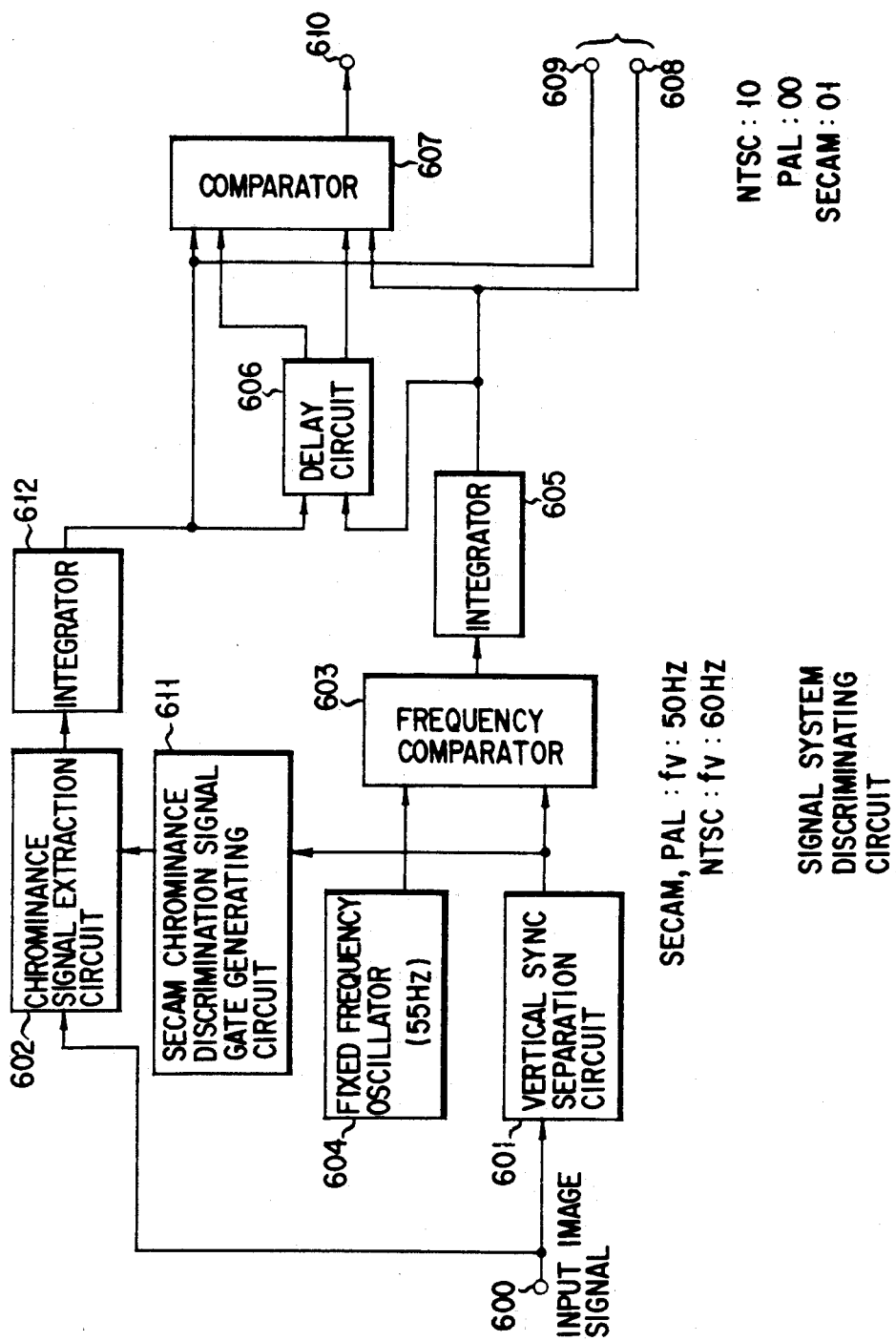
FIG. 3 is a block diagram showing an example of the system discriminating circuit shown in FIG. 1.

Embodiments of the present invention will now be described with reference to the accompanying drawings.

FIG. 1 shows an embodiment of the present invention. A signal received by an antenna 200 is supplied to a tuner 201, in which a desired channel is selected. An intermediate frequency signal output from the tuner 201 is amplified by an intermediate frequency amplifier 202 and supplied to a detector 203 which outputs a video signal. The video signal output from the detector 203 is selected by a selector 204 and supplied to a sync reproduction and deflection control circuit 206 and an analog-to-digital (A/D) converter 207. The selector 204 can select an image signal externally input through a terminal 205.

A digital signal output from the A/D converter 207 is supplied to an image signal processing apparatus 210, which is constituted by a plurality of DSPs connected to one another. A video signal output from the image signal processing apparatus 210 is supplied to a digital-to-analog (D/A) converter 208 and converted to an analog image signal, which is supplied to a color cathode ray tube 209.

The image signal processing apparatus 210 is connected to a loader 501, which is utilized for writing external program data supplied from a program memory 211 into the DSPs in the image signal processing apparatus 210.

At this time, the program data suitable for the television system of the input image signal is selected from the external program memory 211 and automatically written in the DSPs by means of a system discriminating circuit 500. The system discriminating circuit 500 discriminates the system of the image signal supplied from the selector 204, i.e., whether the image signal is of the NTSC system, the PAL system, or the SECAM system.

The system discriminating circuit 500 supplies a bank select signal to the external program memory 211 having a plurality of banks. Each bank stores a plurality of programs corresponding to the above mentioned systems. When the system discriminating circuit 500 discriminates the system of the input image signal, it supplies a trigger pulse as a sync signal to the loader 501. As a result, the programs selected from the program memory 211 are successively transmitted through the loader 501 to the DSPs in the image signal processing apparatus 210. Thus, a signal processing mode in the image signal processing apparatus 210 is determined.

In this embodiment, the loader 501 is automatically controlled by the system discriminating circuit 500 to load the external programs suitable for the television system of the input image signal to the DSPs. For example, assume that the signal processing programs for the NTSC system are first set in the DSPs and a signal of the NTSC system is being processed, and thereafter the signal source is changed, a tape of the PAL system is played back by a VTR, and a reproduced image signal is input to the apparatus of the embodiment. In this case, the program data for the PAL system is set in the DSPs by the above-described system discriminating function. Thus, the apparatus of the above embodiment operates suitably.

In the above embodiment, the television system of the input image signal is automatically discriminated by the system discriminating circuit 500 and the programs of the DSPs are automatically changed. However, the television system of the input image signal can be discriminated by the user and the programs can be changed manually.

FIG. 2 shows another embodiment of the present invention. The portions common to those of the embodiment of FIG. 1 are identified with the same reference numerals as in FIG. 1. Hence, the descriptions of the common portions are omitted, and only different portions will be described below. In this embodiment, a bank select signal can be supplied to the external program memory 211 by using switches 214 and 215. Each of the switches 214 and 215 is connected between an earth line and a power source line. External programs for a desired television system can be selected by combination of the outputs "0" and "1" of the switches 214 and 215. A trigger pulse can be supplied to the loader 213 through a switch 212. When a trigger pulse is supplied to the loader 213 through the switch 212, the programs selected by the switches 214 and 215 are transferred to the DSPs in the image signal processing apparatus 210.

Each of the switches 212, 214 and 215 may be controlled by a remote control system.

FIG. 3 shows the detailed structure of the system discriminating circuit 500 shown in FIG. 1.

An image signal output from the selector 204 is supplied to an input terminal 600. The image signal is supplied to a vertical sync separation circuit 601 and a chrominance signal extraction circuit 602. A vertical sync signal separated by the vertical sync separation circuit 601 is input to a frequency comparator 603 and compared with a 55 Hz signal output from a fixed frequency oscillator 604. A frequency error signal obtained by the frequency comparator 603 is input to an integrator 605, which removes a noise component from the frequency error signal and outputs a discrimination signal representing whether the input image signal is of the NTSC system, or the PAL or SECAM system. In the case of the NTSC system, the input image signal has a vertical frequency of 60 Hz, and in the case of the PAL or SECAM system, the input image frequency has a vertical frequency of 50 Hz. Therefore, different results are obtained by comparing the vertical frequencies with the frequency of 55 Hz. More specifically, if a signal of the NTSC system is input to the frequency comparator 603, the output of the integrator 605 is of high level, whereas if a signal of the PAL or SECAM system is input, the output of the integrator 605 is of low level. The output the integrator 605 is supplied to a delay circuit 606, a comparator 607, and an output terminal 608.

The PAL system and the SECAM system can be discriminated by detecting whether the input image signal includes a chrominance discrimination signal in a vertical blanking period (in the case of the SECAM system, the input image signal includes a chrominance discrimination signal in a vertical blanking period). To discriminate this, the output of the vertical sync separation circuit 601 is supplied to a SECAM chrominance discrimination signal gate generating circuit 611. An output of the SECAM chrominance discrimination signal gate generating circuit 611 is supplied to a chrominance signal extraction circuit 602. In the case of the SECAM system, a chrominance discrimination signal is extracted by the chrominance signal extraction circuit 602 by a filtering operation. The chrominance discrimination signal is integrated by an integrator 612, in which a noise component is removed. In this case, the output level of the integrator 612 is high. On the other hand, in the case of the PAL system, the output level of the integrator 612 is low. An output of the integrator 612 is supplied to the delay circuit 606, the comparator 607, and an output terminal 609.

Consequently, a discrimination signal is obtained at the output terminals 608 and 609: (1, 0) in the NTSC system, (0, 0) in the PAL system, and (0, 1) in the SECAM system. The discrimination signal is added to an upper address of the external program memory 211 as data to select a program.

The comparator 607 monitors the difference between an input to the delay circuit 606 and an output therefrom. The delay circuit 606 delays outputs from the integrators 605 and 612 by 1 to several fields. If the level of the output of the delay circuit 606 differs from that of the input thereto, the comparator 607 determines that the system of the input image signal is changed, and supplies a trigger pulse through a terminal 610 to the loader 501. As a result, the program data suitable for the system of the input image signal is set to the DSPs.

In the above description, means for discriminating standard television systems (NTSC, PAL, SECAM) are indicated. However, there are many other television systems: for example, a combination of the PAL system and the NTSC system in which a color subcarrier frequency of the PAL system is used in the NTSC chrominance signal modulation system. To discriminate the system more specifically, it is necessary to use additional discriminating functions. The following are examples of the discriminating functions.

(1) Discrimination between the color subcarrier frequencies

A color subcarrier frequency of 4.42 MHz or 3.58 MHz may be used, irrespective of the modulation system of a chrominance signal. In this case, a discrimination signal can be obtained by band-pass filters.

(2) Discrimination by using the ratio of a horizontal frequency to a color subcarrier frequency In the case of the PAL system, the relationship between the frequency $F_{sc}$ of a color subcarrier and a horizontal frequency fH is as follows:

$$F_{sc}=(284-(\tfrac{1}{4}))fH+25\ Hz$$

Hence, whether a signal is of the PAL system can be determined by detecting whether the phase of the subcarrier is shifted 360° in four horizontal periods.

In the case of the NTSC system, the relationship between the frequency $F_{sc}$ of a color subcarrier and a horizontal frequency fH is as follows:

$$F_{sc}=455/fH$$

Whether a signal is of the NTSC system can be determined by detecting whether the phase of the subcarrier is changed 360° in two horizontal periods.

(3) Discrimination by the relationship between a horizontal frequency and a frame frequency In general, the number of horizontal scanning lines is 625 in the PAL system and 525 in the NTSC system. The systems can be discriminated by counting sync signals in one frame.

An IC for processing TV signals of multi standard systems, called TA8659AN, is sold on the market. The algorithm used in the IC can be used as a signal system discriminating circuit of the present invention.

In the above embodiments, the functions of the system discriminating circuit and the loader are performed by hardware. However, the functions can be performed by a microcomputer or a DSP.

FIG. 4 shows one of DSPs A1 to A16 in the image signal processing apparatus 210. An input terminal 301 receives from the loader 213 transfer program data PD which is to be stored in the DSP, a write address WA, a write pulse WP, a control signal SW, and the like. The transfer program data PD is supplied from the terminal 301 through a switch 305 to an input/output portion of an internal program memory, i.e., a program RAM 306. A plurality of upper bits of the write address WA is supplied to an upper address decoder 302 and a plurality of lower bits thereof is supplied to a switch 303. The write pulse WP is supplied to one input of an AND circuit 304, which calculates the logical product of the write pulse WA and an output of the upper address decoder 302. An output of the AND circuit 304 is supplied to a write pulse input section of the program RAM 306. The control signal SW is supplied to control terminals of the switches 305 and 303 through a broken line shown in FIG. 4.

When a program is to be stored in the program RAM 306, the switch 305 is switched to select program data supplied from the terminal 301, and the switch 303 is switched to select address data supplied from the terminal 301, in response to a control signal SW (data write start signal). As a result, the program can be transferred to the program RAM 306.

When the program in the program RAM 306 is to be used, count address data is supplied from the program counter 311 through the switch 303 to the program RAM 306 as a read address. An internal read pulse is used as a read pulse. The program data read from the program RAM 306 is supplied through the switch 305 to a command decoder 312. The command decoder 312 decodes command data, which is supplied to an ALU (arithmetic and logic unit) 313, a register file 314, and a memory 315. The command data is also supplied to I/0 ports 316, 317, 318, and 319. The I/0 ports 316 to 319, the ALU 313, the register file 314, and the memory 315 are connected one another by address and data bus 320. With this structure, the DSP performs a data operation in accordance with the command of the command decoder 312. A timing pulse from the sync reproduction and deflection control circuit 206 is supplied to the program counter 311.

Figure 5:
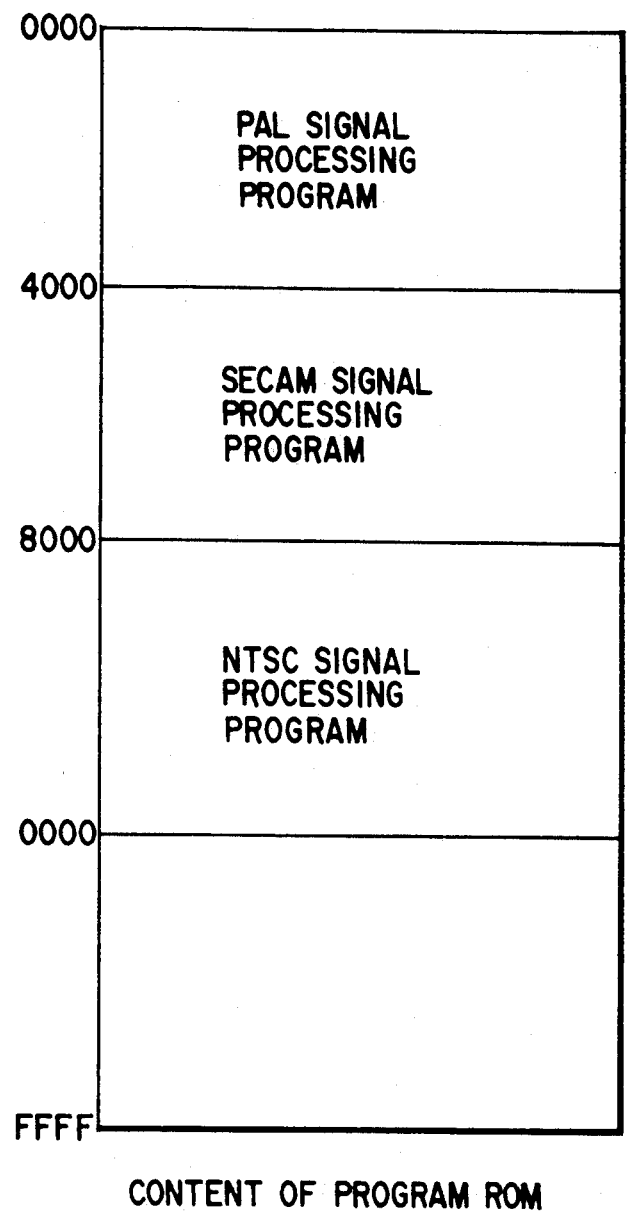
FIG. 5 is a diagram showing data format of an external program memory.
Figure 6:
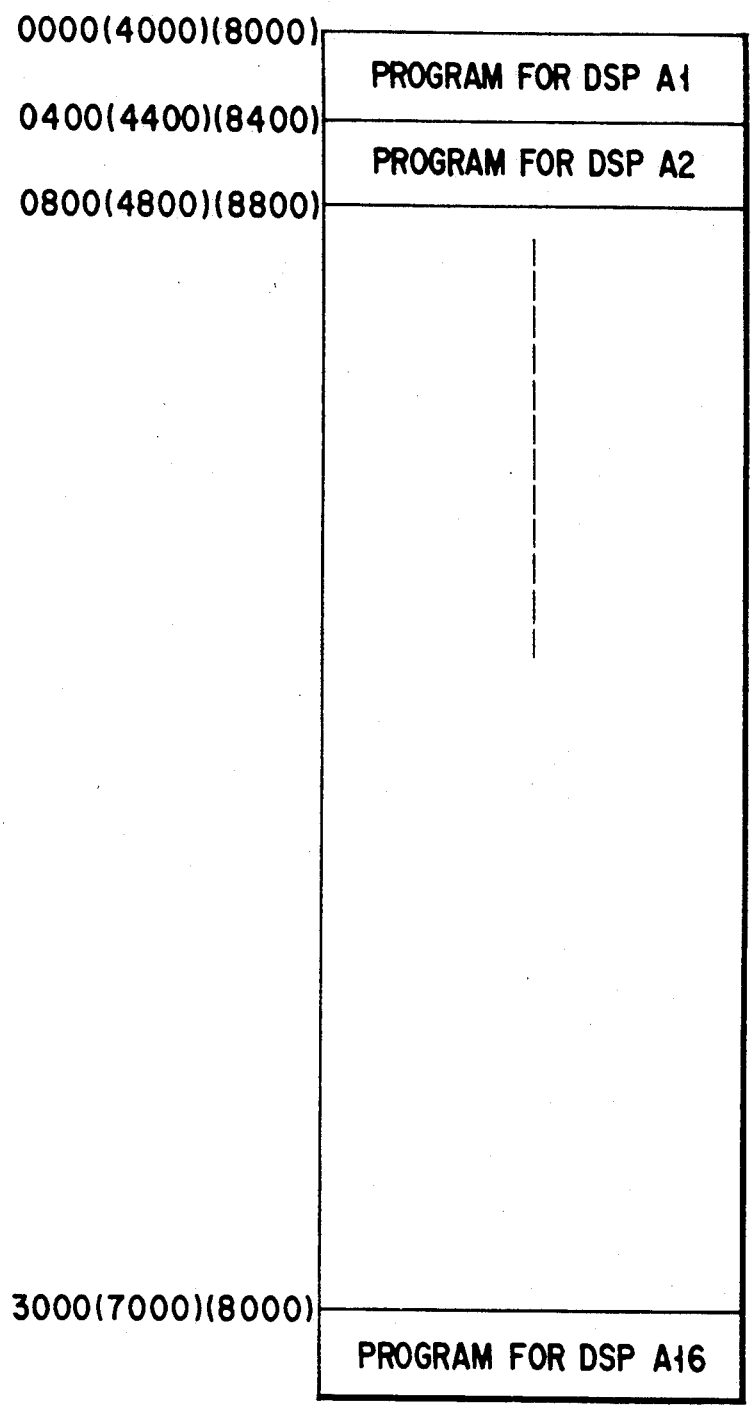
FIG. 6 is a diagram showing detailed data format of the external program memory.

FIGS. 5 and 6 are schematic views show data storage states in the external program memory 211 shown in FIGS. 1 and 2. The memory is divided into, for example, four banks. Signal processing programs for the PAL system are stored in the address range 0000 to 3FFF. Signal processing programs for the SECAM and NTSC systems are respectively stored in the address range 4000 to 7FFF and 8000 to BFFF. One of the four banks is selected by the above-described operation of the switches 214 and 215 shown in FIG. 2. Each bank is divided into sixteen regions as shown in FIG. 6 which respectively stores programs for the DSPs A1 to A16.

Figure 7:
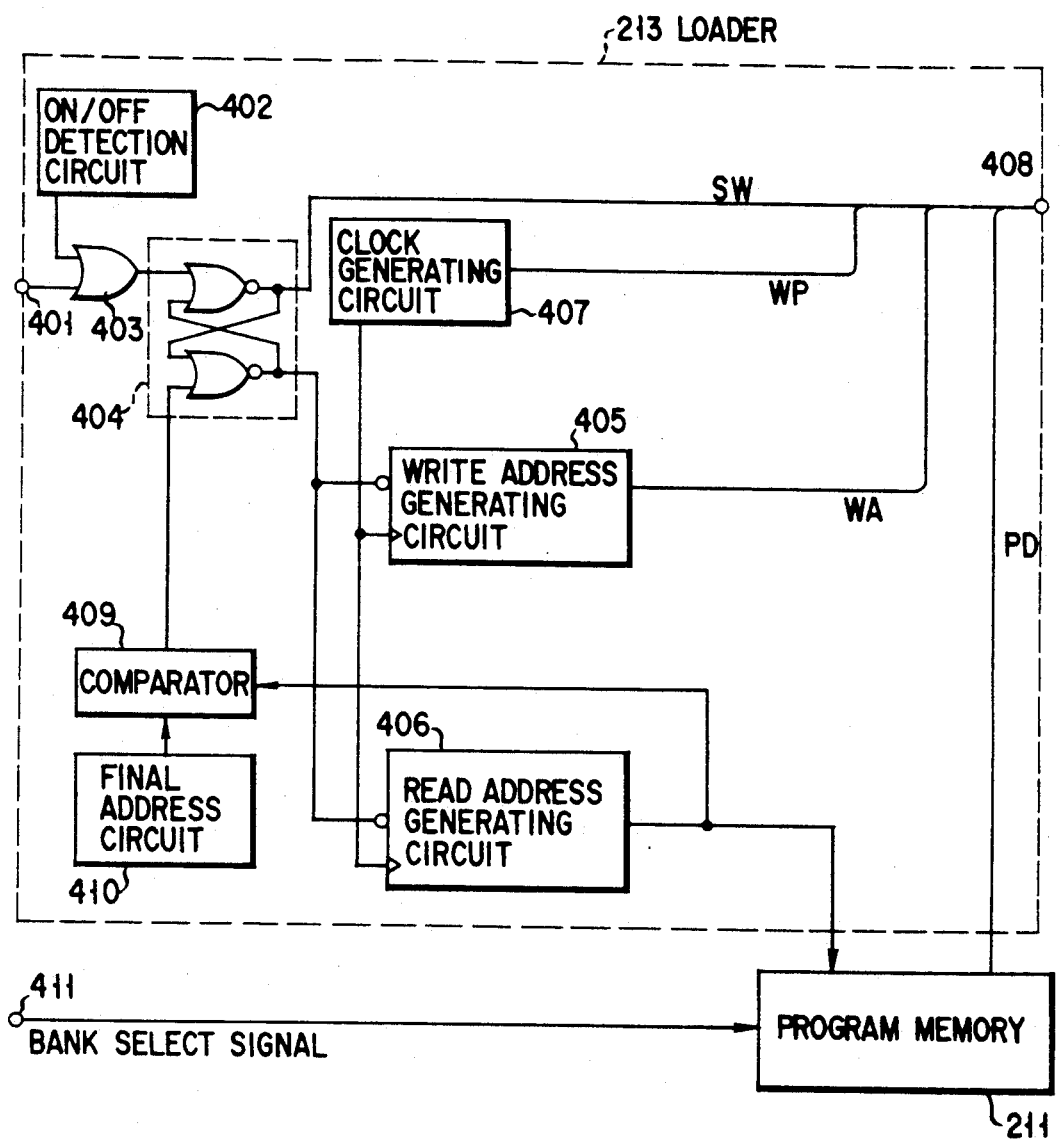
FIG. 7 is a diagram showing a structure of the loader shown in FIGS. 1 and 2.

FIG. 7 shows the relationship between the loader 213 and the external program memory 211. The loader 501 in FIG. 1 is the same structure with loader 213. The loader 213 receives a trigger pulse through a terminal 401. The trigger pulse is supplied from the switch 212 in FIG. 2 or the system discriminating circuit 500 in FIG. 1. A power ON detection circuit 402 outputs a detection signal, which is supplied together with the trigger pulse through an OR circuit 403 to a set terminal of a flip-flop circuit 404. When the flip-flop circuit 404 is set, it outputs a switch control signal SW from one output terminal thereof and an enable signal from the other output terminal thereof. The enable signal is supplied to a write address generating circuit 405 and a read address generating circuit 406. A clock signal is supplied from a clock generating circuit 407 to the write and read address generating circuits 405 and 406. A read address generated from the read address generating circuit 407 is supplied to a read address input terminal of the external program memory 211. As a result, program data PD is read from the external program memory 211 and output to an output terminal 408. A write address WA output from the write address generating circuit 405 is also supplied to the output terminal 408. The switch control signal SW output from the flip-flop 404 is output through the output terminal 408 and supplied to the switches 305 and 303 shown in FIG. 4. A write pulse WP is output from the clock generating circuit 407 to the output terminal 408.

Termination of program data transmission is detected in the following manner. A comparator 409 compares an output of the read address generating circuit 406 with a final address output from a final address circuit 410. If these outputs coincide with each other, the comparator 409 outputs a reset pulse to a reset terminal of the flip-flop circuit 404. As a result, the system is returned to an initial state. The above-mentioned bank select signal is supplied to the external program memory 211 through a terminal 411.

In this manner, program data is transferred from the external program memory 211 to the program RAM 306 shown in FIG. 4. The upper address decoder 302 identifies which one of the programs for the DSPs A1 to A16 is transmitted from the program memory 211, with the upper bits of the write address. For example, if the upper four bits of the write address is 0000, the DSP A1 is selected. Assuming that the circuit shown in FIG. 4 is the DSP A1, the write pulse WP from the write pulse line 321 passes through the AND circuit 304 and supplied to the program RAM 306 only when the DSP A1 is designated.

In the same manner, the program data is set to all of the DSPs A1 to A16 with the address ranging from 0000 to 3FFF. Therefore, the comparator 409 in FIG. 7 does not output a reset pulse unless the read address is 3FFF.

Figure 8:
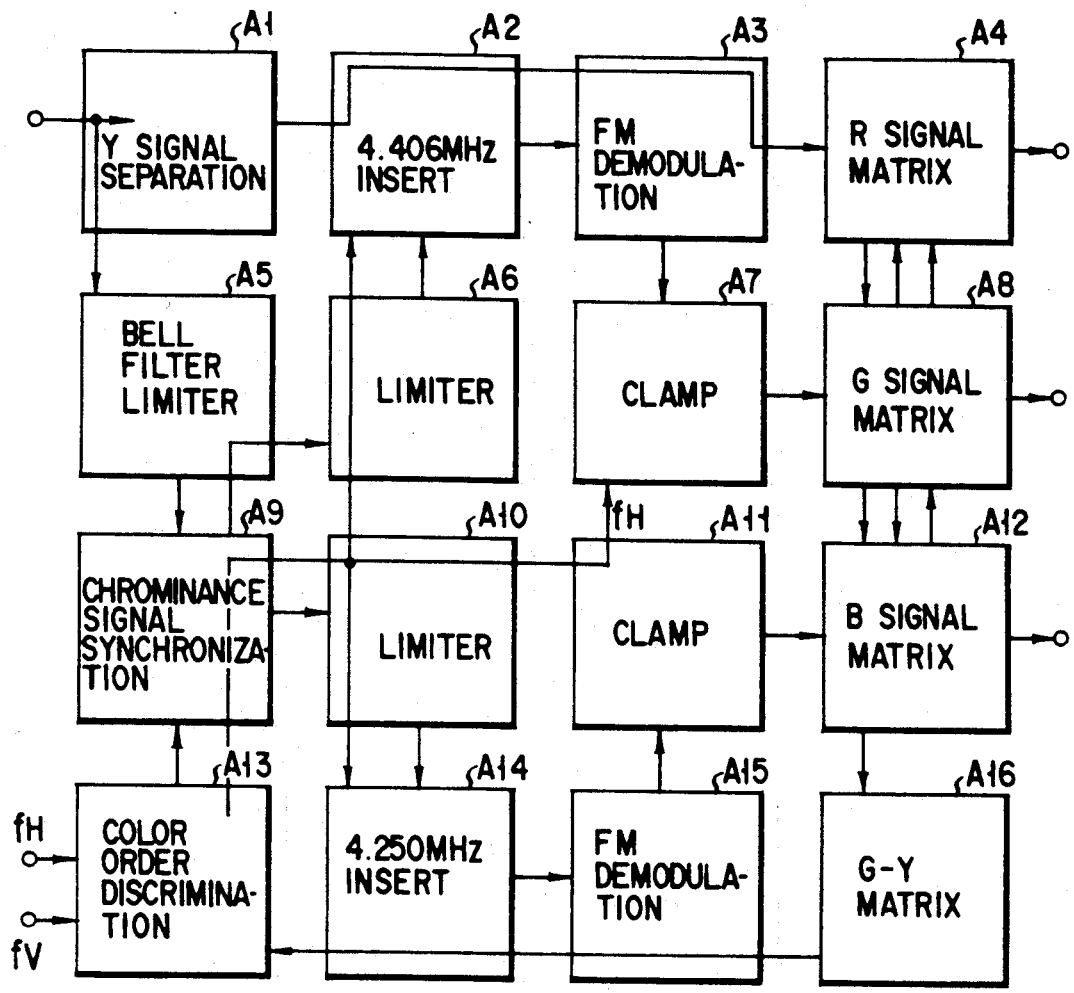
FIG. 8 is a diagram showing signal processing functions of the DSPs in the case of processing a SECAM signal.

FIG. 8 shows functions of the DSP A1 to A16 set by programs for processing a signal of the SECAM system, when a signal of the SECAM system is processed. The SECAM system requires a luminance signal separating function (DSP A1), a chrominance signal separating function (DSP A5), a synchronization processing function for processing chromatic signals transmitted in a line-sequential manner (DSP A9), a limiter function (DSPs A6, A10), a chromatic signal inserting function (DSPs A2, A14), an FM demodulating function (DSPs A3, A15), a clamp function (DSPs A7, A11), a matrix function (DSPs A4, A8, A12, A16), and a color order discriminating function for discriminating the order of chromatic signals transmitted in a line-sequential manner (DSP A13).

Figure 9:
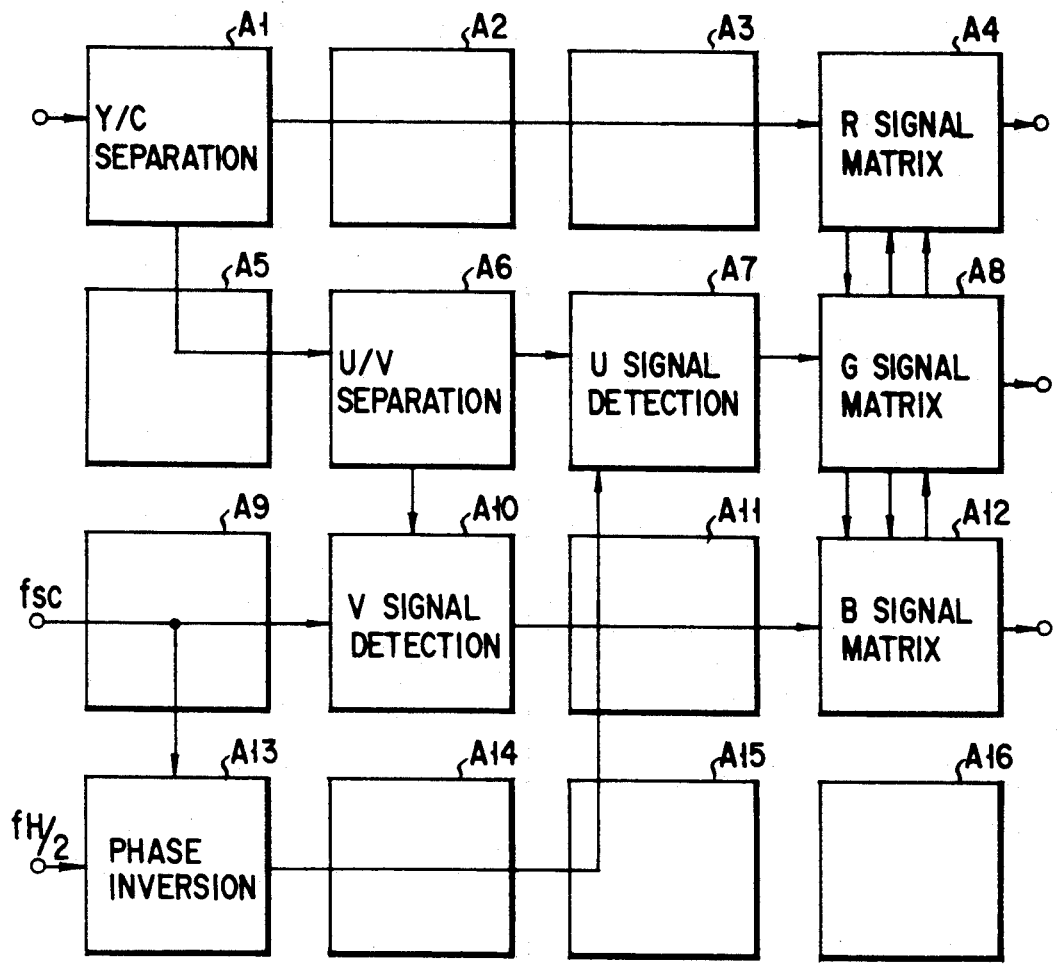
FIG. 9 is a diagram showing signal processing functions of the DSPs in the case of processing a PAL signal.

FIG. 9 shows functions of the DSP A1 to A16 set by programs for processing a signal of the PAL system, when a signal of the PAL system is processed. The PAL system requires a function of separating a luminance signal and a chrominance signal (Y/C separation) (DSP A1), a function of separating a U signal and a V signal, which are chrominance signals (DSP A6), a synchronization detecting function (DSPs A7, A10), and a matrix function (DSPs A4, A8, A12). It also requires a function for producing a detection carrier in phase-synchronism with U and V signals (DSPs A9, A13), since the U signal is phase-inverted in every horizontal line.

Figure 10:
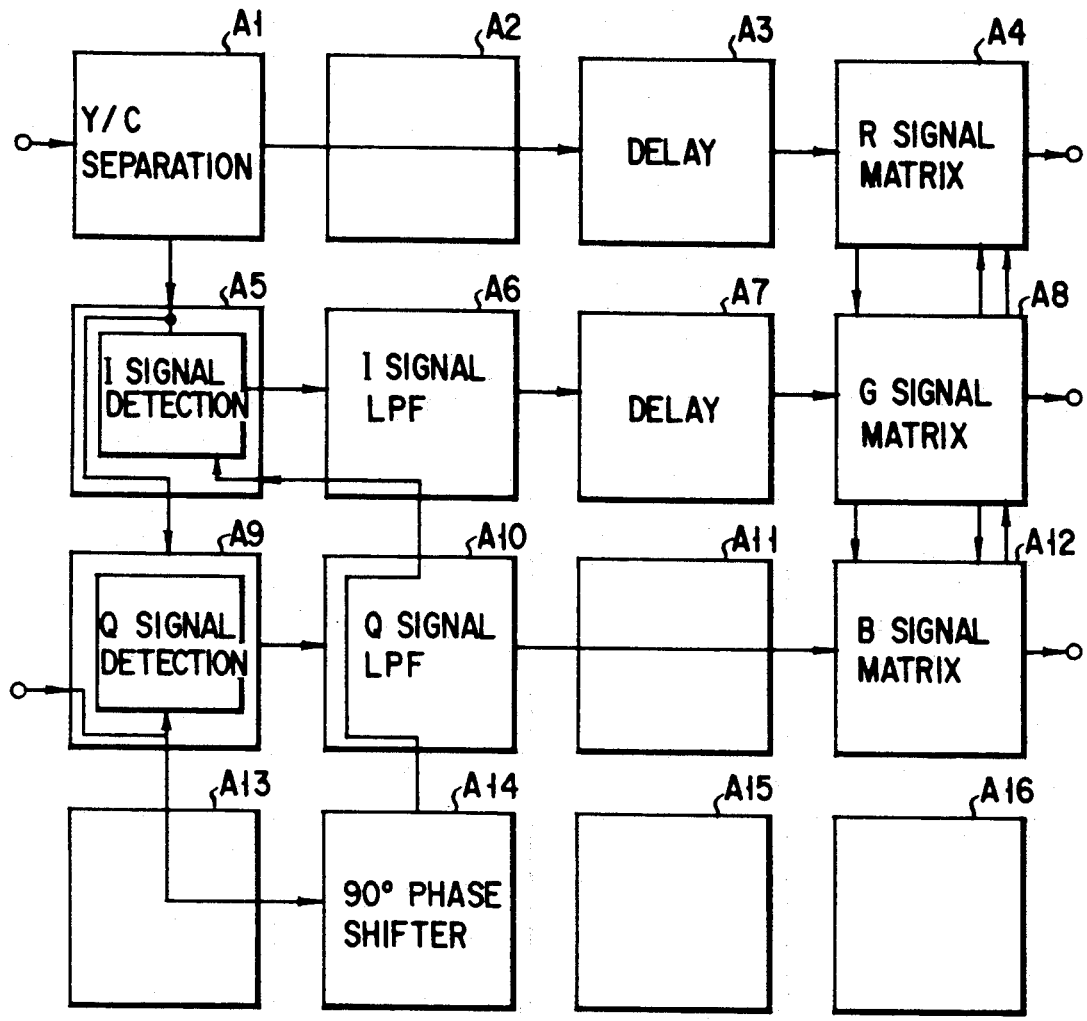
FIG. 10 is a diagram showing signal processing functions of the DSPs in the case of processing an NTSC signal.

FIG. 10 shows functions of the DSP A1 to A16 set by a program for processing a signal of the NTSC system, when a signal of the NTSC system is processed. The NTSC system requires a function of separating a luminance signal and a chrominance signal (Y/C separation) (DSP A1), a function of sync-detecting an I signal and a Q signal, which are chrominance signals (DSPs A5, A9), a filtering function (DSPs A6, A10), a delay function for time-adjustment (DSPs A3, A7), a matrix function (DSPs A4, A8, A12), and a detection carrier producing function (DSP A14).

According to the present invention, the external program memory stores signal processing programs corresponding to a plurality of television systems. Thus ready-made DSPs can be easy used. And even if a new television system is developed, above mentioned embodiments can be utilized by changing the external program memory.

According to the embodiment in FIG. 1, the television system of the input signal is automatically discriminated, even if the user does not discriminate it, and the processing programs in the image signal processing section can be automatically set in accordance with the television system. Thus, the television receiver of the present invention is convenient.

In the above embodiments, the loader 501 and 213 are constructed so as to rewrite all of the programs for the DSPs. However, it may be constructed so as to rewrite only some of them, by suitably changing the initial and final values of the write and read address generating circuits 405 and 406. In this case, when a plurality of television systems have a common program, the time required for transmitting the program can be reduced and the program executing operation is not interrupted.

Main signal processing circuits set in DSPs to perform the above-mentioned functions will now be described.

Figure 11A:
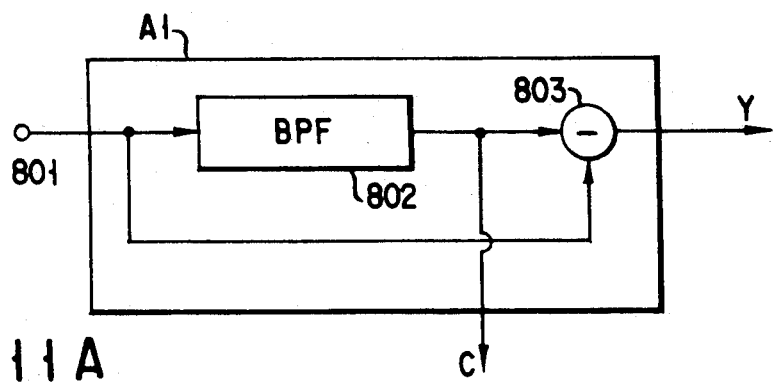
FIG. 11A is a diagram showing a Y/C separating circuit set in a DSP.

FIG. 11A shows a schematic structure of the digital Y/C separating circuit set in the DSP A1. A digital image signal is input through an input terminal 801 to a band pass filter 802, which allows passage of a component in a chrominance signal band. The digital image signal is also input to a subtracter 803. The subtracter 803 subtracts a chrominance signal output from the band pass filter 802 from the image signal output through the input terminal 801. As a result, the subtracter 803 outputs a luminance signal. Since the band pass filter 802 functions as a digital filter, the register section and an arithmetic program in the DSP are utilized for this function.

If bell filter and limiter functions are set in the DSP A5 in FIG. 8, the register section, the digital filtering function by the arithmetic program and the comparison program in the DSP are utilized. When the upper limit of data is set, the comparison program compares input data with upper limit comparison data. If the input data is greater than the upper limit comparison data, surplus data is deleted. To perform a limiting function and a clamp function, the arithmetic program for operating input data and a switching function in the DSP are utilized.

Figure 11B:
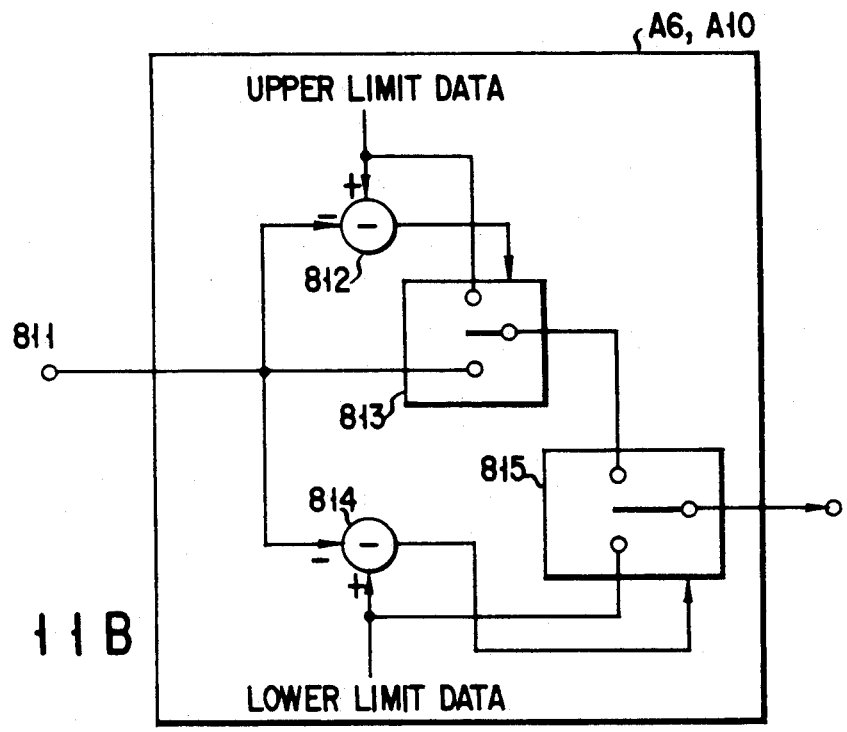
FIG. 11B is a diagram showing a limiter set in a DSP.

FIG. 11B shows a simple limiter circuit set in, for example, the DSP A6 or A10. A digital image signal (input data) is input to a subtracter 812, a switch 813, and a subtracter 814. The subtracter 12 subtracts the input data from upper limit data which is preset in the register. If the difference is positive, the switch 813 output the input data input through the input terminal 811. If the difference is negative (if the input data is greater than the upper limit data), the switch 813 outputs the upper limit data. The output of the switch 813 is supplied to one of the input terminals of a switch 815. The subtracter 814 subtracts the input data from lower limit data. If the difference is negative, the switch 815 selects the output of the switch 813. If the difference is positive (if the input data is smaller than the lower limit data), the switch 815 selects the lower limit data.

Figure 11C:
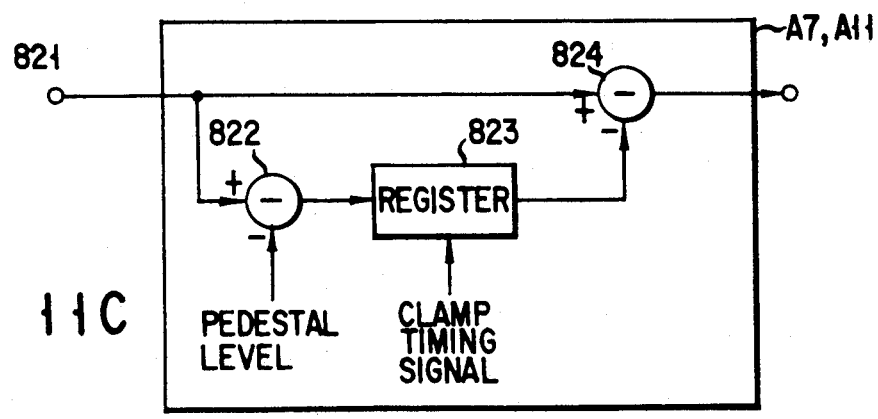
FIG. 11C is a diagram showing a clamp circuit set in a DSP.

FIG. 11C shows a simple structure of a clamp circuit. A digital image signal (input data) is input through an input terminal 821. A subtracter 822 subtracts a preset pedestal level value from the input data and outputs error data. The error data obtained by the subtracter 822 in a pedestal period is held by a register 823 in response to a clamp timing signal. The error data is kept by the register 823 for one horizontal period, and then supplied to a subtracter 824. The subtracter 824 subtracts the error data from the input data. Thus, the clamp function is performed by the register section and the arithmetic program in the DSP.

Figure 12A:
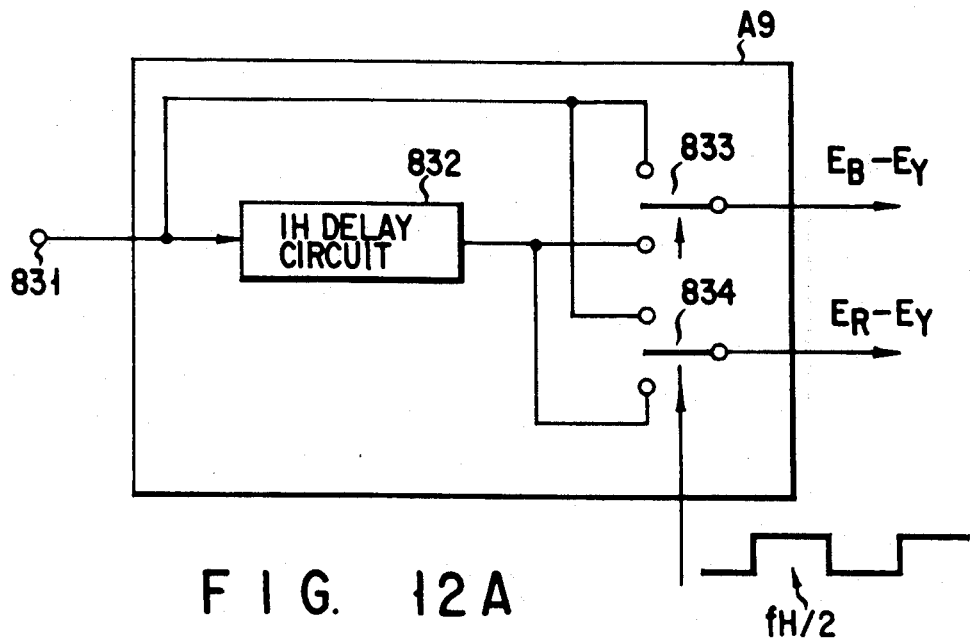
FIG. 12A is a diagram showing a synchronization circuit set in a DSP.

FIG. 12A shows a structure of a synchronization circuit set in the DSP A9 in FIG. 8. In the SECAM system, chrominance signals, i.e., an $E_R-E_Y$ signal and an $E_B-E_Y$ signal are supplied in a line sequential manner. Hence, these signals must be synchronized. For this purpose, a delay circuit which delays a signal by one horizontal period and a switch for alternately selecting an input and output of the delay circuit are required. In FIG. 12A, a digital image signal is input through an input terminal 831 to a delay circuit 832, one input terminal of a switch 833, and one input terminal of a switch 834. An output of the delay circuit 832 is supplied to the other terminals of the switches 833 and 834. As a result, the switch 833 can output only the $E_R-E_Y$ signal and the switch 834 can output only the $E_B-E_Y$ signal. The synchronizing function is achieved by a memory (register) and a selector control program.

To control the switches 833 and 834, a control signal of a frequency fH/2 (fH: horizontal frequency) is required. The (fH/2) control signal is produced in the color order discriminating circuit so as to be in synchronism with the transmission order of chrominance signals.

Figure 12B:
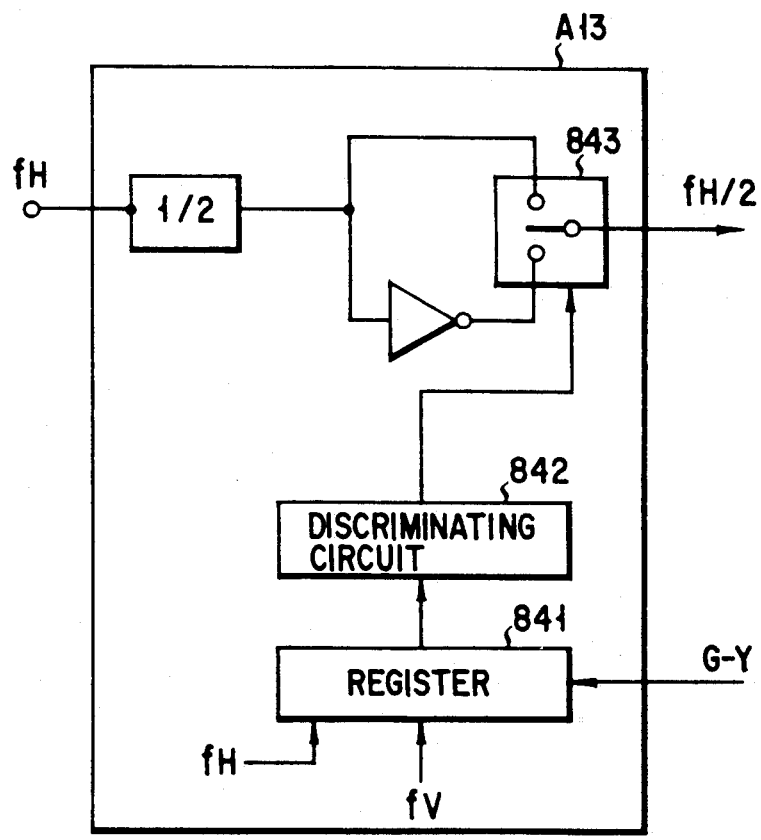
FIG. 12B is a diagram showing a color order discriminating circuit set in a DSP.

FIG. 12B shows a structure of the color order discriminating circuit. A horizontal sync signal (frequency of fH) is supplied to an input terminal 845. The horizontal sync signal is frequency-divided by a ½ frequency divider 486 into a signal of a frequency of fH/2. The fH/2 signal is supplied to an inverter 847 and a switch 843. The switch 843 alternately selects an inverted fH/2 signal and a non-inverted fH/2 signal in every field, and outputs the above-mentioned (fH/2) control signal.

A signal for controlling the switch 843 is produced in the following manner.

In the SECAM system, a reference signal for discriminating the color order is transmitted in a vertical period. When the reference signal in the vertical period is demodulated and a G-Y signal is reproduced, the polarity of the G-Y signal varies for every horizontal line. For example, the G-Y signal is positive if the reference signal is a Db signal, and negative if the reference signal is a Dr signal. The G-Y signal is latched by a register 841 which discriminates the polarity of the G-Y signal and outputs polarity data. The polarity data from the register 841 is input to a discriminating circuit 842. The discriminating circuit 842 discriminates that an $E_B-E_Y$ component is superposed on an odd line, if the polarity data in an odd stage of the register 841 is positive. If the polarity data on an odd stage of the register 841 is negative, the discriminating circuit 842 discriminates that an $E_R-E_Y$ component is superposed on an odd line. The discrimination result is held by the discriminating circuit for one vertical period, and supplied to a switch 842 as a control signal.

As described above, the DSP A13 for color order discrimination uses a frequency dividing program, an inverting program, a selector, a register, and the like.

Matrix processing executed by the DSP A4, A8, and A12 will now be described.

Figure 13A:
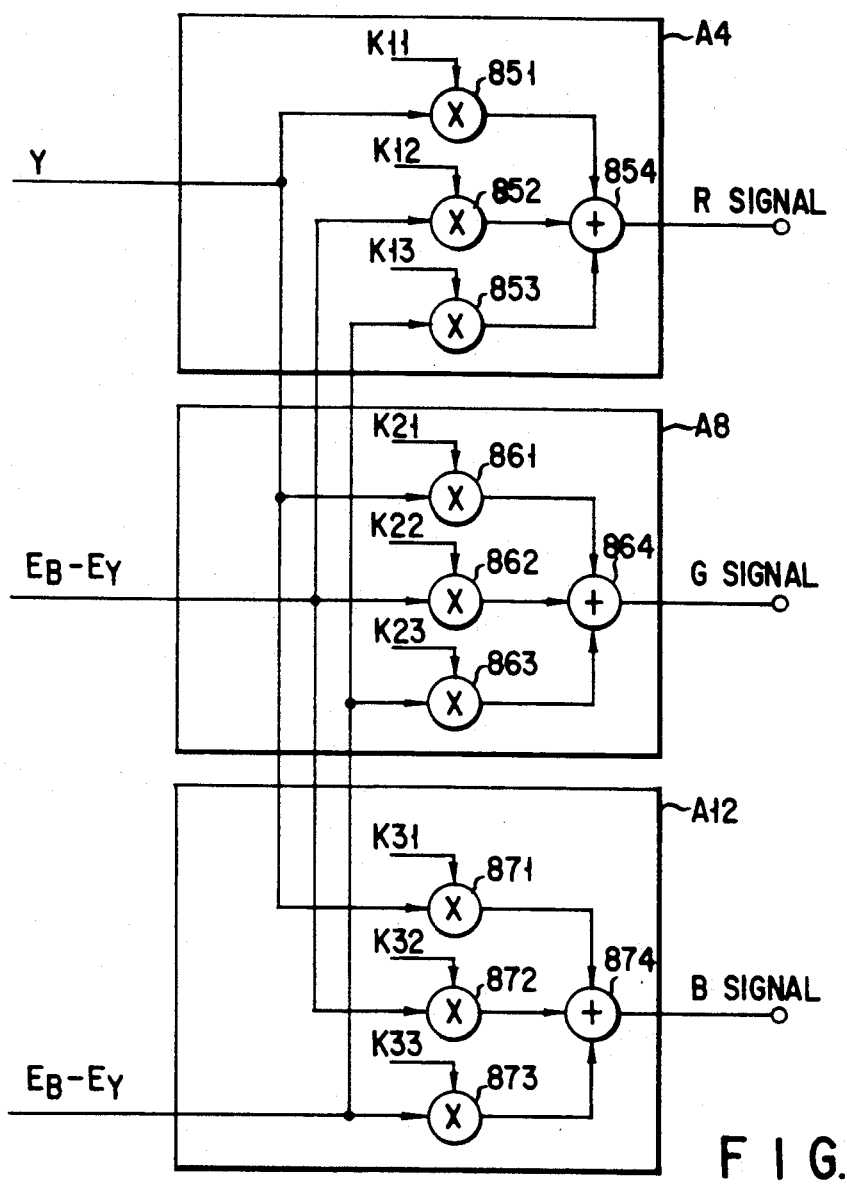
FIG. 13A is a diagram showing matrix circuits set in DSPs.

FIG. 13A is a circuit diagram for performing a matrix processing. A luminance signal Y is input to multipliers 851, 861, and 871. An $E_R-E_Y$ component, which has been FM-demodulated or sync-detected, is input to multipliers 852, 862, and 872. An $E_B-E_Y$ component is input to multipliers 853, 863, and 873. These multipliers 851, 852, 853, 861, 862, 863, 871, 872, and 873 multiply the input signal by coefficients K11, K12, K13, K21, K22, K23, K31, K32, and K33, respectively. Outputs of the multipliers 851, 852, and 853 are added by an adder 854, and their sum is output as an R signal. Outputs of the multipliers 861, 862, and 863 are added by an adder 864, and their sum is output as a G signal. Outputs of the multipliers 871, 872, and 873 are added by an adder 874, and their sum is output as a B signal. Thus, the DSP for performing a matrix processing uses a multiplying program and an adding program.

A circuit for performing a sync detection will now be described.

Figure 13B:
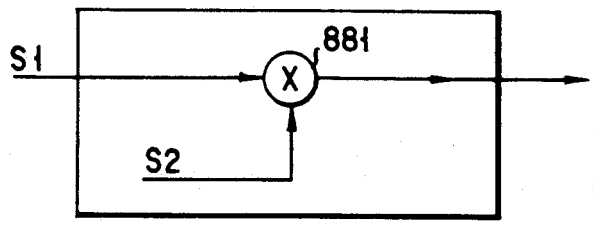
FIG. 13B is a diagram showing a detecting circuit set in a DSP.

FIG. 13B shows a multiplier 881 for multiplying a first signal S1 by a second signal S2. If the signal S2 is a carrier for demodulation, the signal S1 can be sync-detected. The signal S2 is supplied from the sync reproduction circuit 206. The circuit shown in FIG. 13B can be set in the DSPs A7 and A10 in FIG. 9, the DSPs A5, A9 in FIG. 10, if the frequency of the signal S2 is selected suitably. The multiplying program is used to execute this signal processing.

A circuit for performing an FM demodulation will now be described.

FIG. 13C shows a FM demodulator. An input signal is supplied to a band pass filter (BPF) 891 which has a frequency characteristic shown in FIG. 13D. The output signal from the band pass filter 891 is converted to a limited signal having like that an inclination characteristic in that the amplitude is increased from 0 at a frequency f1 to A at a frequency f2. The limited signal is input to an absolute value operation circuit 892, and the absolute value component from the absolute value operation circuit 892 is supplied to a low pass filter (LPF) 893. The output signal from the low pass filter 893 is the amplitude component of the limited signal, that is the FM demodulated signal. According to the above FM demodulator, many kind of FM signals which have different carrier frequencies can be demodulated by the frequencies f1 and f2 are changed and suitably selected.

The DSP for performing an FM modulation uses registers, a multiplying program, an adding program, an absolute value operation program, and like.

The Y/C separation process, the delay process, the filtering process, the sync signal process and the like shown in FIGS. 8 to 10 can be performed by the basic circuits shown in FIGS. 11 to 13 and the above descriptions.

The present invention is not limited to the above embodiments, and various modifications may be made within the spirit and scope of the invention.

What is claimed is:

1. A television receiver using digital signal processors (DSPs) comprising:
   a common external program memory for storing a plurality of programs corresponding to television system;
   A/D converting means for A/D converting an input image signal and for outputting a digital image signal;
   an image signal processing section for processing said digital image signal, said image signal processing section comprising a plurality of DSPs, each of said plurality of DSPs having an internal program memory area for storing said television system programs downloaded from said common external program memory, and at least one of said plurality of DSPs receiving the digital image signal; and
   a television system program loader means for downloading said television system programs from said common external program memory to a predetermined plurality of said plurality of DSPs simultaneously;
   wherein said plurality of DSPs share said common external program memory.

2. A television receiver using DSPs comprising:
   a common external program memory for storing a plurality of programs corresponding to television systems;
   A/D converting means for A/D converting an input image signal and for outputting a digital image signal;
   an image signal processing section for processing said digital image signal, said image signal processing section comprising a plurality of DSPs, each of said plurality of DSPs having an internal program memory area for storing said television system programs downloaded from said common external program memory, and at least one of said plurality of DSPs receiving the digital image signal;
   system discriminating circuit for discriminating the television system of the input image signal, and generating a timing signal representing a change of the television system and a discrimination signal representing the type of the television system; and
   loading means for selecting a program suitable for the television system of the input image signal from said common external program memory;
   wherein said plurality of DSPs share said common external memory.

3. A television receiver using DSPs according to claim 2, wherein said loading means comprises:
   control signal generating means for generating a control signal used to start writing data to the internal program memories, when it receives the timing signal from said system discriminating means;
   write address generating means for designating a write address of each of the internal program memories;
   write timing pulse generating means for generating a write timing pulse for providing data write timing of each said internal program memory; and
   read address generating means for generating a read address used to read a predetermined plurality of said plurality of programs from said common external program memory.

4. A television receiver using DSPs according to claim 3, wherein the discrimination signal output from said system discriminating means is supplied to said external program memory as a bank select signal.

5. A television receiver using DSPs comprising:
   a external program memory for storing a plurality of external programs corresponding to television systems;
   A/D converting means for A/D converting an input image signal and outputting a digital image signal;
   an image signal processing section for processing the digital image signal, said section comprising a plurality of digital signal processors connected to one another, each having an internal program memory, and one of the digital signal processors receiving the digital image signal;
   system discriminating circuit for discriminating the television system of the input image signal, and generating a timing signal representing a change of the television system and a discrimination signal representing the type of the television system, said discrimination signal output from said system discriminating means is supplied to said external program memory as a bank select signal; and
   transmission means for selecting an external program suitable for the television system of the input image signal in accordance with the discrimination signal output from said system discriminating circuit and transmitting predetermined step data of the selected external program to internal program memories of the plurality of digital signal processors in synchronism with the timing signal;
   said transmission means comprising:
   i.) control signal generating means for generating a control signal used to start writing data to the internal program memories, when it receives the timing signal from said system discriminating means;
   ii.) write address generating means for designating a write address of each of the internal program memories;
   iii.) write timing pulse generating means for generating a write timing pulse for providing data write timing of each internal program memory; and
   iv.) read address generating means for generating a read address used to read program data to be written in each internal program memory from said external program memory;
   said internal program memory of each DSP has a data input/output portion connected to a moveable contact of a first switch for selecting one of an internal line and an external line, an address input portion connected to a movable contact of a second switch for selecting one of an internal address line and an external address line, and a write/read timing pulse input portion connected to an output terminal of an AND circuit;

the program data read from said external program memory is supplied to one fixed contact of the first switch and the other fixed contact therof is connected to a command decoder;

a plurality of lower bits of the write address are supplied to one fixed contact of the second switch and an output of a program counter is supplied to the other fixed contact thereof; and the write timing pulse is supplied to one input terminal of the AND circuit and an output of an address decoder is supplied to the other input terminal thereof, the address decoder decoding a plurality of upper bits of the write address and determining whether the DSP is selected.

6. A television receiver using DSP's according to claim 1, wherein a timing signal for changing said television system programs is supplied form a manual operation section.

7. A television receiver using DSP's according to claim 1, wherein a timing signal for changing said television system programs is supplied from a television system discriminating means for automatically discriminating the television system of said input image signal.

8. A television receiver using DSP's according to claim 7, wherein said television system discriminating means generates a discrimination signal representing the type of television system of said input image signal, and said discrimination signal is supplied as a memory bank select signal to said common external program memory.

9. A television receiver using DSPs comprising:

an external program memory for storing a plurality of external programs corresponding to television systems;

A/D converting means for A/D converting an input image signal and outputting a digital image signal;

an image signal processing section for processing the digital image signal, said section comprising a plurality of digital signal processors, each having an internal program memory, and one of the digital signal processors receiving the digital image signal;

control signal generating means, write address generating means, timing pulse generating means, and read address generating means, all provided for reading one of the programs which corresponds to a television system from said external program memory and transmitting predetermined step data of the read program to internal program memories of said plurality of DSPs, said control signal generating means generating a control signal used to start writing data to each of the internal program memories in the DSPs, when it receives a timing signal for changing the program, said write address generating means generating a write address for designating a write address of each internal program memory, said timing pulse generating means generating a timing pulse for providing data write timing of each internal program memory, said read address generating means generating a read address used to read program data to be written in each internal program memory from said external program memory; and a command decoder, a first switch, a second switch, an address decoder, and an AND circuit, all provided on the periphery of each internal program memory, a movable contact of said first switch being connected to a data input/output portion of each internal program memory, one fixed contact thereof being connected to a program data supply portion which receives program data supplied from said external program memory, and the other fixed contact thereof being connected to said command decoder, a movable contact of said second switch being connected to an address input portion of each internal program memory, one fixed contact thereof being connected to a lower-bits input portion of the write address generating means, and the other fixed contact thereof being connected to an output portion of a program counter, and one input terminal of said AND circuit being connected to an input portion of said timing pulse generating means and the other input terminal thereof being connected to an output portion of said address decoder for decoding upper bits of the write address and discriminating whether the DSP incorporating said address decoder is designated.

10. A television receiver using DSPs according to claim 9, wherein a timing signal for changing the program is supplied from a manual operation section.

11. A television receiver using DSPs according to claim 9, wherein a timing signal for changing the program is supplied from system discriminating means for automatically discriminating the system of the input image signal.

12. A television receiver using DSPs according to claim 11, wherein said system discriminating means generate a discrimination signal representing the type of the television system of the input image signal and supply the discrimination signal as a bank select signal to said external program memory.

* * * * *